US009183099B2

(12) United States Patent
Cota-Robles et al.

(10) Patent No.: US 9,183,099 B2
(45) Date of Patent: Nov. 10, 2015

(54) REPLICATION OF A WRITE-BACK CACHE USING A PLACEHOLDER VIRTUAL MACHINE FOR RESOURCE MANAGEMENT

(71) Applicant: VMware, Inc., Palo Alto, CA (US)

(72) Inventors: Erik Cota-Robles, Mountain View, CA (US); Keith Farkas, San Carlos, CA (US); Anne Holler, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 149 days.

(21) Appl. No.: 14/078,185

(22) Filed: Nov. 12, 2013

(65) Prior Publication Data

US 2015/0135003 A1 May 14, 2015

(51) Int. Cl.
*G06F 11/00* (2006.01)
*G06F 11/16* (2006.01)
*G06F 12/08* (2006.01)
*G06F 9/455* (2006.01)
*G06F 9/50* (2006.01)

(52) U.S. Cl.
CPC ............ *G06F 11/1666* (2013.01); *G06F 9/455* (2013.01); *G06F 9/50* (2013.01); *G06F 12/0815* (2013.01); *G06F 9/45533* (2013.01); *G06F 2212/603* (2013.01)

(58) Field of Classification Search
CPC ............ G06F 11/1666; G06F 12/0866; G06F 2212/603; G06F 9/5077
See application file for complete search history.

(56) References Cited

U.S. PATENT DOCUMENTS

| 8,060,683 | B2 * | 11/2011 | Shultz et al. ..................... 711/6 |
| 2007/0094648 | A1 * | 4/2007 | Post .............................. 717/140 |
| 2012/0226866 | A1 * | 9/2012 | Bozek et al. .................. 711/122 |
| 2014/0096139 | A1 * | 4/2014 | Alshinnawi et al. .......... 718/103 |
| 2014/0143496 | A1 * | 5/2014 | Bert .............................. 711/130 |
| 2014/0157040 | A1 * | 6/2014 | Bennah et al. ..................... 714/2 |
| 2014/0181015 | A1 * | 6/2014 | Bonzini ........................ 707/613 |
| 2014/0181397 | A1 * | 6/2014 | Bonzini ........................ 711/112 |

OTHER PUBLICATIONS

Bansal et al., CAR: Clock with Adaptive Replacement, Proceedings of the Third USENIX Conference on File and Storage Technologies, San Francisco, CA, USA, Mar. 31-Apr. 2, 2004, USENIX Association, 15 pages.

The Storage Holy Grail: Decoupling Performance from Capacity, Technical White Paper, Copyright 2013 PernixData, Inc., downloaded on Oct. 25, 2013, www.pernixdata.com, 5 pages.

PernixData FVP, Technical White Paper, Copyright 2013 PernixData, Inc., downloaded on Oct. 25, 2013, www.pernixdata.com, 6 pages.

Hogan, Begin the Journey to a Private cCoud with Datacenter Virtualization, Virtual Flash (vFlash) Tech Preview, VMware vSphere Blog, VMware Blogs, Dec. 11, 2012, 3 pages.

* cited by examiner

*Primary Examiner* — Charles Ehne

(57) ABSTRACT

Exemplary methods, apparatuses, and systems include a first host system configuring storage of the first host to serve as a primary cache for a virtual machine running on the first host. A second host system configures storage of the second host to serve as a secondary cache and boots a placeholder virtual machine. The first host transmits, in response to write operations from the virtual machine directed to the primary cache, copies of the write operations to the second host to create mirrored copies on the secondary cache. The first host acknowledges each write operation from the virtual machine when the write operation is committed to both the primary cache and the secondary cache. When the virtual machine is restarted on the second host in response to a failure or migration event, the secondary cache is promoted to serve as a new primary cache for the virtual machine.

20 Claims, 4 Drawing Sheets

REPLICATION OF A WRITE-BACK CACHE USING A PLACEHOLDER VIRTUAL MACHINE FOR RESOURCE MANAGEMENT

FIELD OF THE INVENTION

The various embodiments described herein relate to replicating dirty data in a write-back cache. In particular, embodiments relate to replicating primary cache writes from a first host system to a secondary cache coupled to or included within a second host system to enable a virtual machine to be failed over or migrated to the second host system and to utilize the secondary cache to access the replicated dirty data when the primary cache is unavailable due to failure of the first host system, network partition, etc.

BACKGROUND OF THE INVENTION

In a virtualized environment, high availability (HA) and migration enable a virtual machine running on a one host system to be resumed or restarted on another host system with minimal interruption to the service provided by the virtual machine. As a part of migration or fail over, one or more virtual devices associated with a virtual machine are moved from one host to another host. For example, the virtual hard drive for the virtual machine may be copied from source to destination while the virtual machine is still running on the source. The virtual machine is then stopped or suspended at the source and restarted or resumed at the destination. While the virtual machine is stopped or suspended at the source, device state and other data that had not been committed to the virtual hard drive are also be copied to the source (if available).

Virtual machines commonly utilize caching to improve input/output performance. Caches typically run in one of two modes, using write-through (WT) or write-back (WB) caching. In both modes, reads are cached in accordance with one of a number of algorithms (e.g., least recently used (LRU), adaptive replacement cache (ARC), CLOCK with Adaptive Replacement with Temporal filtering (CART), etc.). In WT caching, writes are written both to the cache and to the backing storage (e.g., for a virtual machine, to a corresponding virtual hard drive image, which may be implemented as a file in a file system on persistent storage media such as a storage area network (SAN) or network-attached storage (NAS)). The write is not returned as successful until both the write operation to the cache and the write operation to the backing storage succeed. As a result of the data being committed to the backing storage, a virtual machine utilizing a write through cache may be migrated or failed over to another host system without the cache and, therefore, without losing any data that was stored in the cache. In WB caching, however, a write is returned as successful when the write to the cache succeeds (i.e., without waiting for a write to backing storage). As a result, writes to a WB cache may be performed more quickly than writes to a WT cache. A subsequent flush operation writes the WB cache data to the backing storage. Data written to the WB cache but not yet flushed to the backing storage is referred to herein as "dirty data." WB caches typically batch many writes into a single flush operation so a large amount of dirty data may be present in the cache. A large amount of dirty data, having not been committed to the virtual hard drive or other backing storage, slows down the migration/recovery of a virtual machine. For example, when the cache is not accessible for use by the destination host system (i.e., the host upon which the virtual machine has been restarted or resumed), the cache (or at least the dirty data) is to be copied to the destination host while virtual machine is stopped or suspended. The larger the amount of cached data that needs to be transferred, the longer the migration/recovery will take. Even when the cache is accessible to the destination host system, use of the original cache by the migrated/recovered virtual machine typically incurs the expense of slower access to the cache over the network.

SUMMARY OF THE INVENTION

Exemplary methods, apparatuses, and systems include a first host system configuring storage of the first host system to serve as a primary cache for a virtual machine running on the first host system. A second host system in a cluster of interconnected hosts configures storage of the second host system to serve as a secondary cache and boots a placeholder virtual machine on the second host system to reserve processing, memory, or storage resources within the second host system to account for operation of the secondary cache or when the secondary cache is promoted to become a new primary cache. A hypervisor agent/driver running on the first host system intercepts write operations from the virtual machine directed to the primary cache and transmits copies of the write operations to the second host system to create mirrored copies on the secondary cache. The first host system acknowledges the success of each write operation from the virtual machine when the write operation is committed to both the primary cache and the secondary cache to ensure that the primary and secondary caches are consistent. When the virtual machine is restarted or resumes execution on the second host system in response to a failure or migration event respectively, the secondary cache is promoted to serve as a new primary cache for the virtual machine and the placeholder VM is shut down. Whenever a secondary cache becomes inaccessible a new secondary cache is created on a third host in the cluster and a new placeholder VM is booted on the third host.

In one embodiment, the first host system changes the caching policy for the primary cache from write back to write through in response to a change in the number of secondary caches. Upon remediation of the change, e.g., restoring or establishing a new secondary cache, the first host system returns the caching policy to write back.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein include storing write operations both on a write back cache within or coupled to a first host system and a secondary cache within or coupled to a second host system. As a result, the time required during migration to copy dirty data, e.g., data that has not been committed to the backing storage of the primary cache, is reduced. If fail over occurs because the first host system fails or if there is a network partition, the dirty data has been replicated and, therefore, is not lost. Additionally, when a virtual machine that relies upon the primary cache is restarted or resumed on the second host system as a result of fail over or migration respectively, the virtual machine is able to utilize the secondary cache. As a result, the virtual machine does not need to wait for the cache to repopulate with data and gains the benefit of the cache right away.

Figure 1:
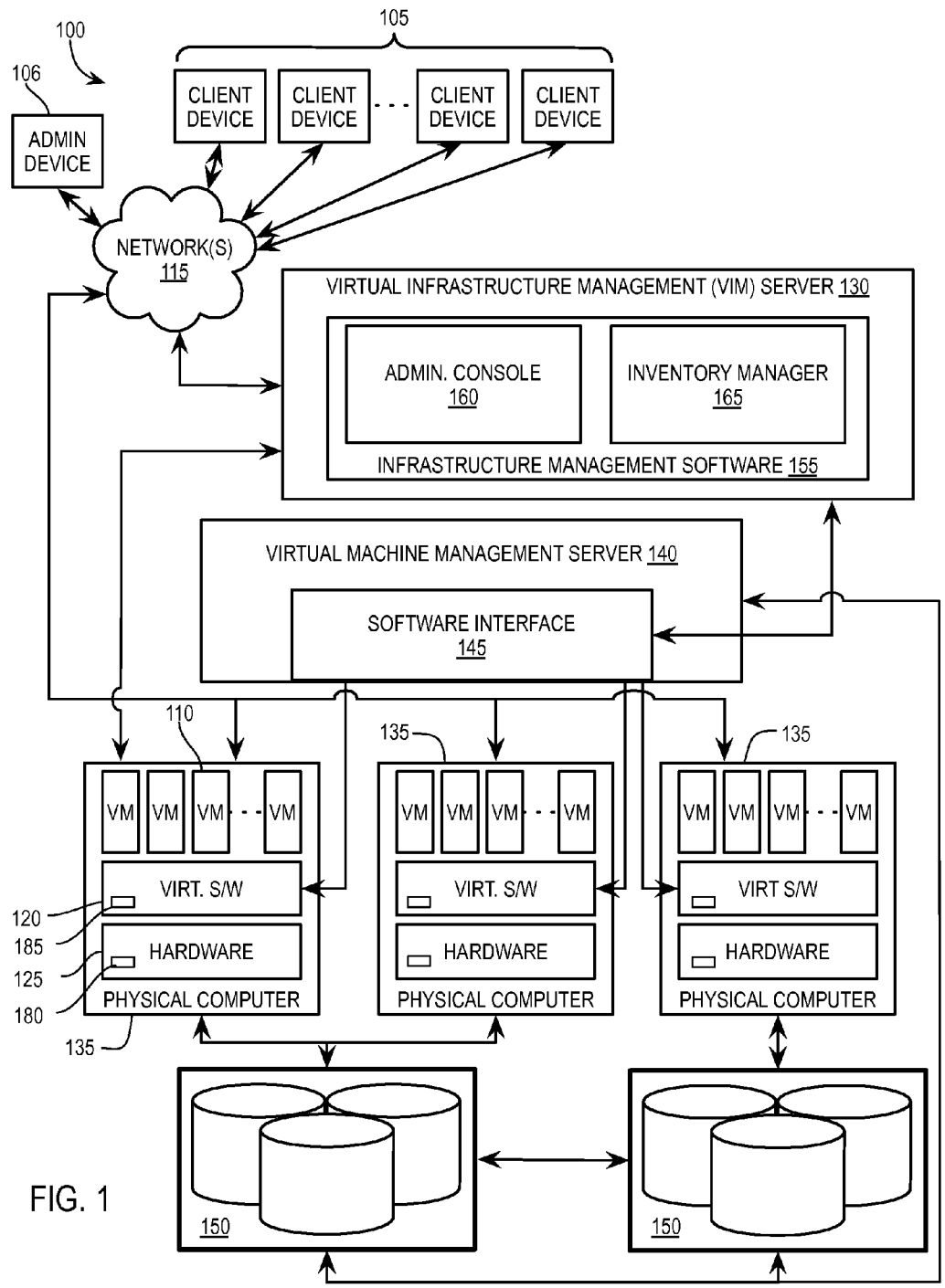
FIG. 1 illustrates, in block diagram form, an exemplary virtual datacenter environment including one or more networked processing devices implementing replication of a write back cache.

FIG. 1 illustrates, in block diagram form, an exemplary virtual datacenter environment 100 including one or more networked processing devices implementing replication of a write back cache. In a write-through cache, when data is written to the cache it is written to the backing storage before returning control back to the process that wrote the data. In contrast, in a write-back cache, when data is written to the cache control is returned to the process that wrote the data before the data is written to the backing storage. The cached data is subsequently written to the backing storage at specified intervals or under certain conditions. Server-based computing in a virtual datacenter environment allows client devices 105 to access centrally-managed user virtual desktops, such as those implemented by VMs 110, via network(s) 115 (e.g., a local area network or other private or publically accessible wide area network, such as the Internet).

VMs 110 are complete computation environments, containing virtual equivalents of the hardware and system software components of a physical system and are typically implemented by an extensive virtualization infrastructure, which includes a variety of software and hardware components. A virtualization software layer 120 (e.g., a hypervisor) running on hardware 125 of physical computer (host system) 135 manages one or more VMs 110. Virtualization software layer 120 manages physical resources, e.g., hardware 125, as well as maintains virtual-to-physical hardware mappings. For example, caching agent/driver 185 runs on or as a part of virtualization software 120 and manages cache 180 as described herein.

In one embodiment virtual infrastructure management (VIM) server 130 orchestrates the provisioning of software defined datacenter services. Exemplary services include virtualized compute, networking, storage, and security services that implement the infrastructure of virtual datacenter 100. VIM server 130 manages the corresponding VMs 110 through communications with software interface 145 of virtual machine management server (VMMS) 140. VMMS 140 is responsible for provisioning and maintaining the multitude of VMs 110 implemented across one or more host systems 135 as well as storage 150 utilized by VMs 110.

VIM server 130 may be a physical computer system or a virtual machine that runs infrastructure management software 155. Infrastructure management software 155 within VIM server 130 manages pools of computer resources to run VMs 110 on a cluster of host systems (i.e., multiple networked host systems 135) with central/graphics processing units (CPU's and/or GPU's), memory, and communications hardware. Infrastructure management software 155 includes one or more modules, including administrative console 160 and inventory manager 165.

Each storage device 150 may be a disk array or other collection data stores. For example, each storage device 150 may implement a redundant array of independent disks (RAID) algorithm to combine multiple drive components into a logical unit and divide and/or replicate data among multiple physical drives. In one embodiment, storage device 150 includes a processing device or other storage controller (not shown) and or a cache (in addition to or in place of cache 180).

Administrative console 160 provides a remotely accessible user interface to administrator device 106 to manage the configuration of VMs 110 within the virtual datacenter 100. In one embodiment, administrative console 160 exports a graphical user interface via hypertext transfer protocol (HTTP) to be accessed by a web browser. Alternatively, a command-line interface or a rich client is provided to administrator device 106, which includes a web browser to access the administrative console. Administrative console 160 allows administrator device 106 to configure or define policies for the automatic configuration of a primary cache 180 for use with a VM 110, a number and/or location of secondary caches 180 to mirror a primary cache 180, and/or caching policies (e.g., write through, write back, caching algorithm, etc.). Additionally, administrative console 160 allows administrator device 106 to perform functions, such as: cloning and migrating VMs, defining VM state policies, configuring storage overcommit settings for different data stores 150, performing rebalance operations on a set of virtual desktops, configuring firewall and other networking/security services, adding servers, isolating multi-tenant organizations, creating datacenter service templates, defining role-based access, monitoring processor, memory, and storage usage/allocation, pooling resources, and other similar operations.

Inventory manager 165 handles the events received from VMs 110 and host systems 135. For example, when a secondary cache 180 become inaccessible to a host system 135, a software agent running on host system 135 sends a notification to inventory manager 165. Inventory manager 165 determines an effective policy that applies to the cache and performs a remediation operation such as creation of a new secondary cache, if required. Inventory manager 165 may also use timer-based events to schedule effective remediation operations.

In general, VMMS 140 provides software interface 145 to enable an administrator or other entity, such as inventory manager 165, to access and manage VMs 110 as described above. Additionally, VMMS 140 supports operations for the discovery of compute, storage, and network resources; creation of logical compute pools by providing features such as automatic CPU and memory load balancing; provisioning/creation of one or more virtual disks, on local or shared storage-clones with full or sparse disks; creation of cloned VMs; and power operations on virtual machines (power on, power-off, suspend, resume, checkpoint, etc.).

While illustrated as separate components, in one embodiment, a single server or other networked processing device implements VIM server 130 and VMMS 140. For example, one or more VMs 110 may implement one or both of VIM server 130 and VMMS 140. Additionally, while only three exemplary host systems 135 are illustrated, additional host systems may be included within virtual datacenter environment 100. For example, host systems 135 within a cluster of thirty or more host systems 135 may implement write back cache replication as described herein.

Figure 2:
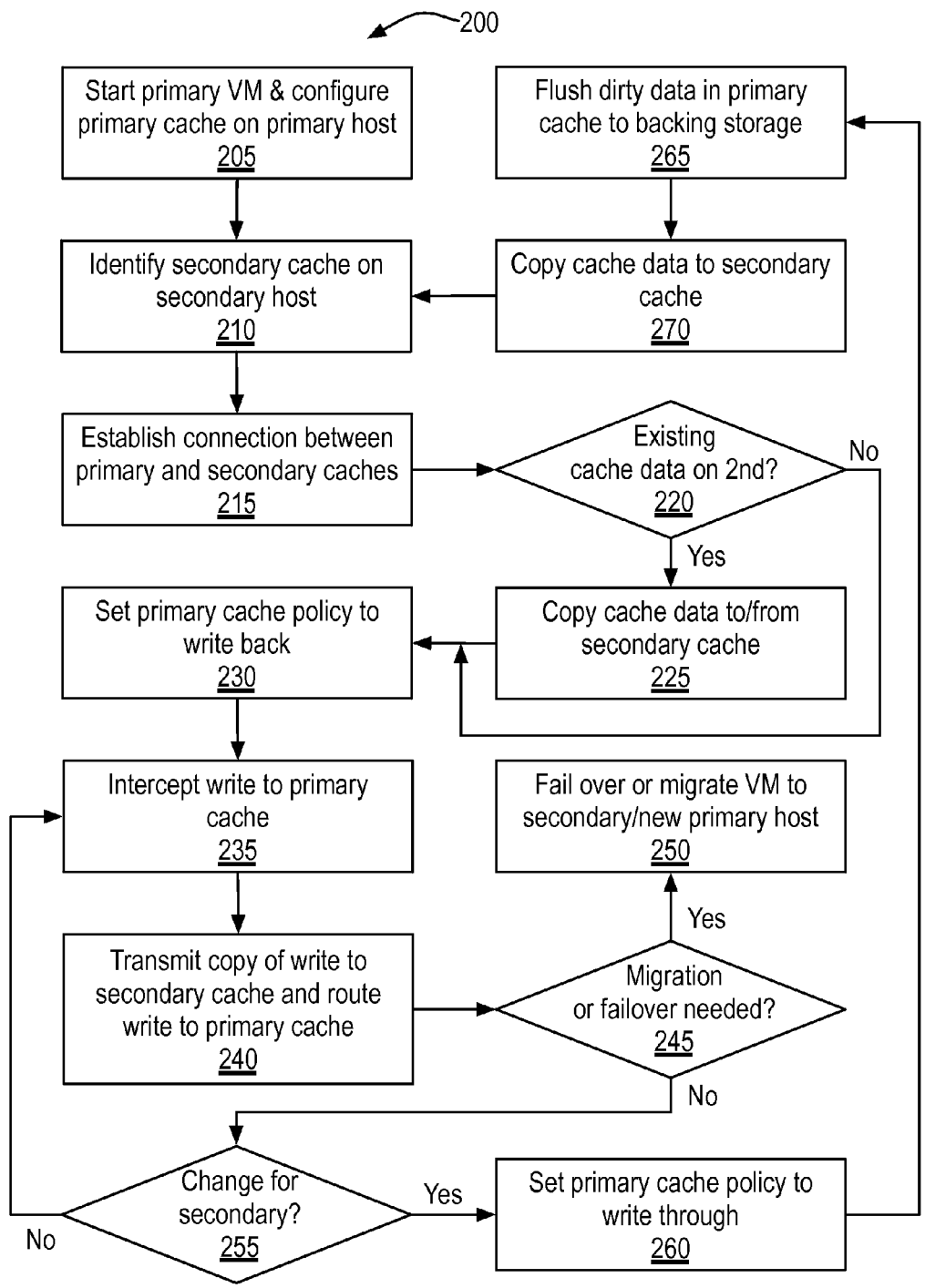
FIG. 2 is a flow chart illustrating an exemplary method of a primary host system replicating a write back cache.

FIG. 2 is a flow chart illustrating exemplary method 200 of a primary host system replicating a write back cache. At block 205, primary host system 135 creates or otherwise starts primary VM 110 using a virtual disk within storage 150. For example, VMMS 140 may select a host system 135 based upon resource utilization and/or another policy and transmit an instruction to that host system 135 to start or create primary VM 110.

Additionally, the instruction or configuration data for primary VM 110 causes primary host system 135 to configure primary cache 180 for primary VM 110. In one embodiment, configuring primary cache 180 includes designating of a portion of storage within primary host system 135 or within storage device 150 to be used by primary VM 110 as a cache. The designated portion may be for the creation of a new cache or the selection of an existing cache within primary host system 135 or within storage device 150. For example, primary VM 110 may have previously run on primary host system 135 and a copy of primary cache 180 may remain from the previous run. Additionally, primary host system 135 may have previously been a secondary host system 135 and included a secondary cache 180, which is now being promoted to become the primary cache 180 (which is also described with reference to FIG. 3). In one embodiment, each cache 180 includes an identification of a corresponding primary VM 110. For example, during configuration of primary cache 180, agent 185 (or primary host system 135 more generally), determines if an existing cache within primary host system 135, a secondary host system 135, or within storage device 150 includes the identification of the corresponding primary VM 110 and, if so, the existing cache is used. In another embodiment, the creation of a new cache includes copying data from an existing cache on another host system 135 (e.g., as described with reference to blocks 220-225).

Additionally, the configuration of primary cache 180 may include one or more of a caching algorithm (e.g., LRU, ARC, CART, etc.), an operation policy (e.g., write through or write back), and a replication policy (e.g., a number of secondary caches 180 to mirror primary cache 180). For example, an administrator or user may select a cache to operate as a write through cache, write back cache with no secondary caches, a write back cache with one secondary cache, a write back cache with two secondary caches, etc. In one embodiment, regardless of the designation of a write back operation policy, primary cache 180 operates as a write through cache until primary cache 180 is connected with one or more secondary caches 180. In one embodiment, an odd number of caches 180 is maintained for a given VM if more than one cache is specified to ensure data consistency. In an alternate embodiment, an even number of caches 180 are used along with a tie-breaking mechanism. For example, another host may maintain metadata about the VM's caches but no data itself. If there is a discrepancy between versions of data stored in the even number of caches, the metadata stored by the other host system is used to break the tie and determine which cache is correct or stores the most recent version of data.

In one embodiment, primary cache 180 is configured in a manner that is transparent to primary VM 110. For example, primary cache 180 may be inserted in the input/output (I/O) path of primary VM 110 with the guest operating system running within primary VM 110 being aware. As a result, VMs 110 are able to share a pool of storage resources for caching and VMs 110 are not aware that they are doing so. Alternatively, primary cache 180 is configured such that primary VM 110 is aware of the cache. In such a VM-aware embodiment, portions of storage are allocated to each VM 110 and these portions are presented as disks within the guest operating system of the corresponding VM 110.

At block 210, primary host system 135 identifies one or more secondary caches 180 on secondary host systems 135. For example, once primary VM 110 is selected or started, a management server 130/140 determines a list of compatible secondary host systems 135 to implement secondary caches 180. The management server 130/140 may make the determination to optimize each host system's cache capacity, optimize the performance of the more important VMs 110, or based upon one or more of files used by primary VM 110, a need to reserve capacity within particular host systems 135, available capacity in other caches 180, a set of host systems 135 capable of running primary VM 110, the other resources required by primary VM 110, etc. For example, primary VMs 110 may be ranked according to their relative importance. Relative importance rankings may be based upon one or more of rankings assigned by an administrator, tasks performed by the VMs 110, data managed by the VMs 110, priority of users of the VMs 110, etc. A primary VM 110 with a high relative importance and its corresponding secondary VMs 110 may be assigned to host systems 135 that are likely to provide the highest level of service, include the greatest/fastest resources, have fast/reliable communication links with one another, etc. Alternatively, agent 185 makes the determination based upon similar information. In one embodiment, VIM server 130, VMMS 140, or one or more host systems 135 maintains a database or other data structure that maps the selected primary and secondary host systems 135 and caches 180 to enable agent 185 to determine the list of compatible secondary host systems 135.

At block 215, primary host system 135 establishes a connection between primary cache 180 and secondary cache(s) 180. For example, agent 185 within primary host system 135 may establish a reliable data transfer (RDT) connection with each secondary host system 135 to ensure delivery of data between respective caches 180. In one embodiment, once secondary host systems 135 have started and configured secondary VMs 110 and secondary caches 180, VMMS 140 notifies primary host system 135 that secondary host systems 135 are ready to establish a connection and receive replicated data.

At block 220, primary host system 135 optionally determines if there is existing data within a secondary cache 180 to be copied to primary cache 180. For example, if primary VM 110 is being restarted as a part of a fail over or migration or otherwise has existing dirty data stored within a secondary cache 180 that is not stored with primary cache 180, agent 185 facilitates the copying of the dirty data at block 225. Similarly, if primary cache 180 currently stores data not stored on a secondary cache 180, agent 185 facilitates the copying of the data at block 225.

In one embodiment, if the primary VM 110 is being restarted due to a failure and it was configured for write back, agent 185 determines which of the VM's caches 180 are accessible to the host system 135. Agent 185 further determines whether the number of accessible caches 180 is a majority of the caches 180 and if these cache instances are data consistent. If these conditions are met (or if the cache policy was set to write through) agent 185 allows primary VM 110 to power on. If these conditions are not met (accessible caches 180 are not a majority of the caches 180 and data is inconsistent between accessible caches 180), agent 185 blocks the power on and reassesses the condition of caches 180 when additional host systems 135 or storage devices 150 become accessible.

Otherwise, at block 230, primary host system 135 sets the operation policy for primary cache 180 to write back. As discussed above, configuration of primary cache 180 may include setting the operation policy. In one embodiment, when primary cache 180 is to operate as a write back cache and there are no existing caches, the setting of the operation policy to write back is delayed until the connection with secondary cache(s) 180 is established. Until the connection is established, primary cache 180 operates as a write through cache to prevent any potential loss of dirty data prior to the ability to mirror writes to secondary cache(s) 180.

At block 235, agent 185 (or, more generally, hypervisor 120) intercepts each write operation from primary VM 110 and directed to primary cache 180. Agent 185 generates a copy of the write operation and, at block 240, transmits each copy to secondary cache 180 and routes the write operation to primary cache 180. In response to successfully storing the write operation in both primary cache 180 and secondary cache(s) 180 (e.g., as confirmed via the RDT connection), hypervisor 120 transmits an acknowledgment of the successful write to primary VM 110.

At block 245, hypervisor 120 (or an agent running on hypervisor 120) monitors primary VM 110 and primary cache 180 for a failure or migration event. In one embodiment, a failure includes primary VM 110 losing access to its datastore 150 or primary VM 110 crashing. If such an event occurs, at block 250, primary VM 110 is failed over or migrated to a secondary host system 135 or a new primary host system 135. Restarting or resuming primary VM 110 on a secondary host system 135 is described with reference to FIG. 3 below. Otherwise, or additionally, the restarted or resumed VM 110 and new primary cache 180 are configured and operated on another host system 135 according to method 200 described above. For example, in facilitating a fail over or migration of primary VM 110 to another host system 135, management server 130/140 may select between a secondary host system 135 with an existing secondary cache 180 or a new secondary host system 135 without an existing secondary cache 180 based upon host system resource availability/utilization, performance characteristics, predicted recovery/restart times, etc.

If no migration or failure event is detected, at block 255, hypervisor 120 (or an agent running on hypervisor 120) monitors for a change of secondary VM(s) 110 or secondary cache(s) 180. Exemplary changes include a secondary VM 110 or secondary cache 180 failing and the addition or removal of a secondary cache 180 (e.g., in response to a policy change from administrator device 106). For example, VMMS 140 or another host system 135 may alert hypervisor 120 of primary host system of such a change. Additionally, if primary host system 135 fails to receive acknowledgement of a write operation transmitted to secondary host system 135 for secondary cache 180 within a threshold period of time, hypervisor 120 of primary host system 135 may determine that secondary host system 135 or secondary cache 180 has failed. A new secondary cache 180 may be configured on another host system 135 (e.g., a third host system) and connected to primary cache 180 in response to such a change as described below with reference to FIG. 3.

If hypervisor 120 detects no change at block 255, method 200 continues with intercepting and transmitting copies of write operations to secondary cache(s) 180 at blocks 235 and 240. If hypervisor 120 detects a change, at block 260, primary host system 135 optionally alters the operation policy for primary cache 180 to write through. Additionally, at block 265, primary host system 135 optionally flushes/copies dirty data from primary cache 180 to persistent storage 150. As a result, the potential loss of dirty data or inconsistency between caches 180 is prevented while the change in secondary cache(s) 180 is implemented.

At block 270, primary host system 135 optionally copies cached data (or a portion thereof) from primary cache 180 to the new/recovered secondary cache 180. Alternatively, an existing secondary host system 135 copies cached data (or a portion thereof) from a secondary cache 180 to the new/recovered secondary cache 180. When the change to secondary cache(s) 180 is complete, method 200 resumes at block 210 with primary host system 135 confirming secondary cache(s) 180 for primary cache 180, establishing connection to any new/recovered secondary cache(s) 180 at block 215, etc.

Figure 3:
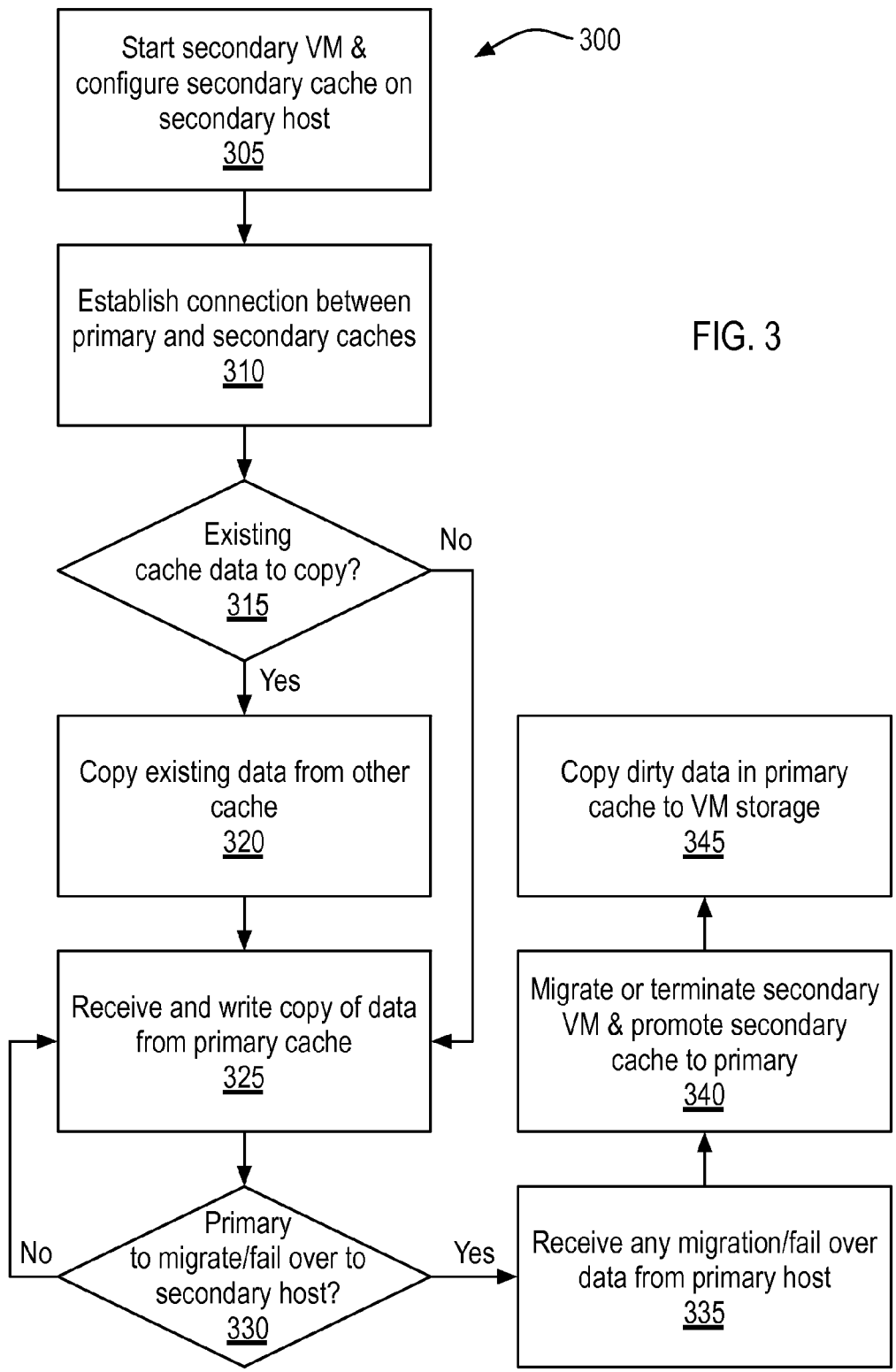
FIG. 3 is a flow chart illustrating an exemplary method of a secondary host system replicating the write back cache.

FIG. 3 is a flow chart illustrating exemplary method 300 of a secondary host system replicating the write back cache. At block 305, secondary host system 135 creates or otherwise starts secondary VM 110 using a virtual disk within storage 150. For example, VMMS 140 may select a host system 135 based upon resource utilization and/or another policy and transmit an instruction to that host system 135 to start or create secondary VM 110. Configuring a cache as secondary enables the cache to be read and written as described herein, but otherwise keeps secondary cache 180 in a slave/mirror mode. For example, while dirty data in primary cache 180 may be flushed to persistent storage 150, dirty data in secondary caches 180 is not flushed to persistent storage 150.

In one embodiment, secondary VM 110 is booted to a halt instruction. As a result, secondary VM 110 consumes minimal CPU and memory resources in and of itself while serving as a placeholder on secondary host system 135. A placeholder VM enables VMMS 140 to associate and reserve processing, memory, and/or storage resources for the secondary cache within secondary host system 135, thereby enabling management servers 130/140 to distribute resources in an efficient manner and to allow for the promotion of secondary cache 180 to primary cache 180 in response to a migration or fail over event. For example, a cache 100 gigabytes in size will require a significant amount of metadata for logical block addresses or other structures to facilitate access to cached data and if the secondary host system 135 does not account for this memory when placing the cache, the other VMs running on the secondary host system 135 may incur greater memory pressure. The placeholder VM reserves the appropriate resources for this metadata and enables the management servers 130/140 to redistribute this load when needed by migrating the placeholder VM in the same manner as any other VM, subject to an anti-affinity rule with respect to the primary VM and other sibling placeholder VMs for the same cache. As a result, the migration or other transfer of a host system's cache to another host system 135 can be implemented by migrating or otherwise moving the placeholder VMs to the other host system 135. Additionally, placeholder VMs enable a load balancer to manage cache capacity along with other resources without introducing an abstraction to represent the cached data. If a failed VM 110 cannot be restarted because no host system 135 can meet the VM's resource needs (e.g., the VM's cache requirement), the load balancer can be invoked to make capacity available (e.g., by migrating or terminating another VM 110).

At block 310, secondary host system 135 establishes a connection with primary host system 135 as described above. In one embodiment, agent 185 within secondary host system 135 receives a request from primary host system 135 or otherwise identifies primary host system 135 (as described above) to establish a reliable data transfer (RDT) connection and ensure delivery of data between respective caches 180.

At block 315, secondary host system 135 determines if existing cache data is to be copied to secondary cache 180. As described above, a previously operating primary or secondary cache 180 may include unflushed write operations or other cache data to copy to this new, migrated, or recovered secondary cache 180. For example, secondary host 135 may include an existing secondary cache 180 or secondary host 135 may include a new secondary cache 180 with no data. If existing cache data is to be copied, at block 320, the existing cache data is received and stored by secondary cache 180.

Upon completion of copying the existing data, or if no existing data is to be copied, secondary host system 135 receives copied write operations from primary host system 135 that are intended for primary cache 180 at block 325. Secondary host system 135 (e.g., utilizing agent 185) stores the received write operations in secondary cache 180 and transmits an acknowledgement for each successful write back to primary host system 135.

At block 330, hypervisor 120 (or an agent running on hypervisor 120) within secondary host 135 monitors for a failure or migration of primary VM 110. For example, a management server 130/140 or primary host system 135 may transmit an indication of a fail over or migration event. If no fail over or migration event is detected, method 300 continues receiving and storing write operations in secondary cache 180 at block 325.

If primary VM 110 is to be restarted on secondary host 135, at block 335, secondary host 135 receives any migration or fail over data from primary host 335. For example, primary host system 135 or a management server 130/140 transfers or initiates the transfer of any data (e.g., primary VM 110 virtual disk data and memory or other data not yet committed to the virtual disk) that was not previously transmitted to or otherwise not accessible to secondary host 135 according to a fail over or migration policy.

At block 340, while primary VM 110 is migrated to or otherwise restarted on secondary host system 135, secondary host system 135 migrates or otherwise terminates secondary VM 110 and promotes secondary cache 180 to become primary cache 180 for primary VM 110 being resumed or restarted, respectively, on secondary host system 135. For example, upon or in anticipation of resuming/restarting the primary VM 110 on secondary host system 135, secondary cache 180 is transferred from the placeholder VM to the primary VM 110. In one embodiment, a management server 130/140 or agent 185 within secondary host system 135 initiates the promotion of secondary cache 180. After promoting the secondary cache 180 the management server 130/140 or agent 185 within secondary host system 135 shuts down the placeholder VM to free up processing, memory, and/or storage resources reserved by the placeholder VM. In response to transferring secondary cache 180 from the placeholder VM to the primary VM 110, secondary cache 180 is configured to operate as the primary/master cache. As a result, the newly promoted primary cache 180 on secondary host system 135 handles I/O requests, flushes dirty data to backing storage, and is subject to mirroring of data to secondary cache(s) 180 as described herein. In one embodiment, as a part of the promotion of secondary cache 180 to primary cache 180, secondary host system 135 sets the cache operation policy to write through (e.g., until new secondary cache(s) are established as described above with reference to FIG. 2).

At block 345, secondary host system 135 optionally flushes/copies dirty data from the new primary cache 180 to persistent storage 150. As a result, the potential loss of dirty data or inconsistency between caches 180 is prevented while a new secondary cache(s) 180 is instantiated on another host system 135.

Upon completion of restarting or resuming primary VM 110 on secondary host 135 and promoting secondary cache 180 to primary, secondary host 135 is promoted to primary and may begin method 200 at block 205 or 210 as described above.

Figure 4:
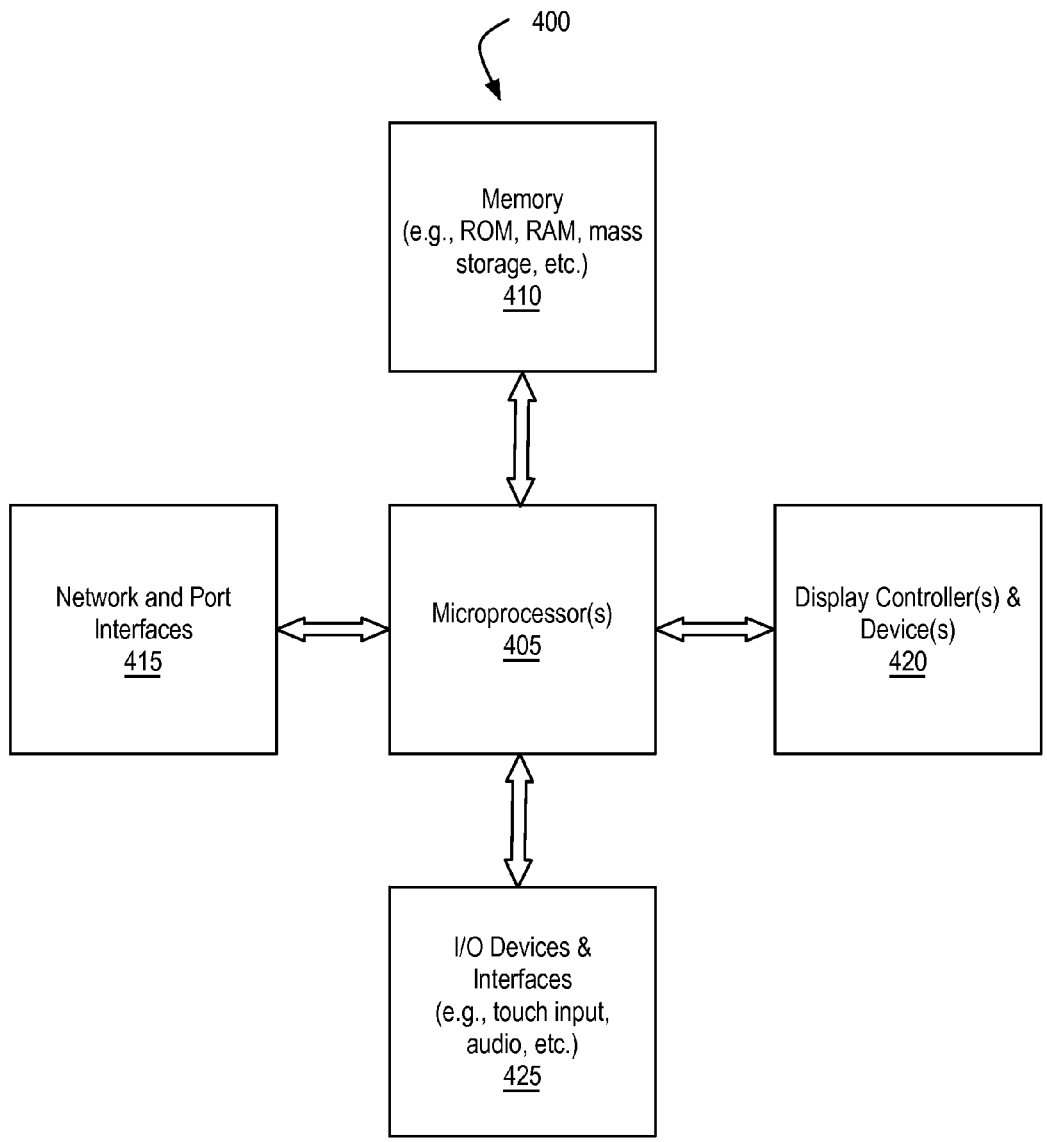
FIG. 4 illustrates, in block diagram form, an exemplary processing system to implement one or more of the methods of write back cache replication.

FIG. 4 illustrates, in block diagram form, exemplary processing system 400 to implement one or more of the methods of write back cache replication. Data processing system 400 includes one or more microprocessors 405 and connected system components (e.g., multiple connected chips). Alternatively, data processing system 400 is a system on a chip.

Data processing system 400 includes memory 410, which is coupled to microprocessor(s) 405. Memory 410 may be used for storing data, metadata, and programs for execution by the microprocessor(s) 405. Memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 410 may be internal or distributed memory.

Data processing system 400 includes network and port interfaces 415, such as a port, connector for a dock, or a connector for a USB interface, FireWire, Thunderbolt, Ethernet, Fibre Channel, etc. to connect the system 400 with another device, external component, or a network. Exemplary network and port interfaces 415 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 400 with another device, external component, or a network and receive stored instructions, data, tokens, etc.

Data processing system 400 also includes display controller and display device 420 and one or more input or output ("I/O") devices and interfaces 425. Display controller and display device 420 provides a visual user interface for the user. I/O devices 425 allow a user to provide input to, receive output from, and otherwise transfer data to and from the system. I/O devices 425 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 4.

Data processing system 400 is an exemplary representation of one or more of client device(s) 105, administrator device 106, VIM server 130, host system(s) 135, VMMS 140, and storage device(s) 150 described above. Data processing system 400 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 400 may be a network computer, server, or an embedded processing device within another device or consumer electronic product. As used herein, the terms computer, device, system, processing system, processing device, and "apparatus comprising a processing device" may be used interchangeably with data processing system 400 and include the above-listed exemplary embodiments.

It will be appreciated that additional components, not shown, may also be part of data processing system 400, and, in certain embodiments, fewer components than that shown in FIG. 4 may also be used in data processing system 400. It will be apparent from this description that aspects of the inventions may be embodied, at least in part, in software. That is, the computer-implemented methods 200 and 300 may be carried out in a computer system or other data processing system 400 in response to its processor or processing system 405 executing sequences of instructions contained in a memory, such as memory 410 or other non-transitory machine-readable storage medium. The software may further be transmitted or received over a network (not shown) via network interface device 415. In various embodiments, hardwired circuitry may be used in combination with the software instructions to implement the present embodiments. Thus, the techniques are not limited to any specific combination of hardware circuitry and software, or to any particular source for the instructions executed by data processing system 400.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
   configuring, by a first host system, storage of the first host system to serve as a primary cache for a virtual machine running on the first host system;
   configuring, by a second host system, storage of the second host system to serve as a secondary cache;
   booting, by the second host system, a placeholder virtual machine on the second host system to reserve processing, memory, or storage resources within the second host system to account for operation of the secondary cache or when the secondary cache is promoted to become a new primary cache;
   transmitting, in response to each of a plurality of write operations from the virtual machine directed to the primary cache, the write operations from the first host system to the second host system to create mirrored copies on the secondary cache, wherein the first host system forwards, to the virtual machine running on the first host system, an acknowledgement of success of each write operation from the virtual machine when the write operation is committed to both the primary cache and the secondary cache;
   restarting or resuming the virtual machine on the second host system in response to a failure or migration event; and
   promoting the secondary cache to serve as the new primary cache for the virtual machine in response to the restarting or resuming of the virtual machine on the second host system.

2. The computer-implemented method of claim 1, wherein the primary cache operates as a write back cache.

3. The computer-implemented method of claim 1, wherein the transmitting of write operations to the second host system includes a hypervisor agent running on the first host system intercepting the write operations from the virtual machine, transmitting a copy of the intercepted write operation to the second host system, and routing the write operation to the primary cache.

4. The computer-implemented method of claim 1, wherein configuring the storage of the first host system to serve as the primary cache includes using an existing cache within the storage of the first host system.

5. The computer-implemented method of claim 1, further comprising:
   identifying, in response to the restarting or resuming of the virtual machine on the second host system, a third host system including another secondary cache for the virtual machine;
   booting a placeholder virtual machine on the third host system to account for operation of the new secondary cache;
   transmitting, from the second host system to the third host system, write operations directed to the new primary cache to create mirrored copies on the other secondary cache; and
   shutting down the placeholder virtual machine on the second host system.

6. The computer-implemented method of claim 1, wherein the first or second host system is selected based upon the first or second host system's cache capacity, the relative importance of the virtual machine, resources upon which the virtual machine or other virtual machines depend, files used by the virtual machine, available capacity in other caches, a set of host systems capable of running the virtual machine, or to reserve capacity within a particular host system.

7. The computer-implemented method of claim 1, further comprising:
- determining, by the first host system, that an acknowledgement has not been received from the second host system within a threshold period of time to confirm the write operation was committed to the secondary cache;
- configuring, by a third host system in response to the determination, storage of the third host system to serve as a new secondary cache;
- booting a placeholder virtual machine on the third host system to account for operation of the new secondary cache; and
- transmitting, in response to write operations from the virtual machine directed to the primary cache, the write operations from the first host system to the third host system to create mirrored copies on the third cache.

8. The computer-implemented method of claim 1, further comprising:
- altering, by the first host system, a primary cache operating policy from operating as a write back cache to a write through cache in response to a failure or migration of a mirror cache;
- transmitting, by the first host system, dirty data from the primary cache to backing storage for the virtual machine in response to the altered operating policy; and
- altering, by the first host system, the primary cache operating policy from operating as a write through cache to a write back cache in response to recovery or completed migration of the mirror cache.

9. A non-transitory computer-readable medium storing instructions, which when executed by a processing device, cause the processing device to perform a method comprising:
- configuring, by a first host system, storage of the first host system to serve as a primary cache for a virtual machine running on the first host system;
- configuring, by a second host system, storage of the second host system to serve as a secondary cache;
- booting, by the second host system, a placeholder virtual machine on the second host system to reserve processing, memory, or storage resources within the second host system to account for operation of the secondary cache or when the secondary cache is promoted to become a new primary cache;
- transmitting, in response to each of a plurality of write operations from the virtual machine directed to the primary cache, the write operations from the first host system to the second host system to create mirrored copies on the secondary cache, wherein the first host system forwards, to the virtual machine running on the first host system, an acknowledgement of success of each write operation from the virtual machine when the write operation is committed to both the primary cache and the secondary cache;
- restarting or resuming the virtual machine on the second host system in response to a failure or migration event; and
- promoting the secondary cache to serve as a new primary cache for the virtual machine in response to the restarting or resuming of the virtual machine on the second host system.

10. The non-transitory computer-readable medium of claim 9, wherein the primary cache operates as a write back cache.

11. The non-transitory computer-readable medium of claim 9, wherein the transmitting of write operations to the second host system includes a hypervisor agent running on the first host system intercepting the write operations from the virtual machine, transmitting a copy of the intercepted write operation to the second host system, and routing the write operation to the primary cache.

12. The non-transitory computer-readable medium of claim 9, wherein configuring the storage of the first host system to serve as the primary cache includes using an existing cache within the storage of the first host system.

13. The non-transitory computer-readable medium of claim 9, the method further comprising:
- identifying, in response to the restarting or resuming of the virtual machine on the second host system, a third host system including another secondary cache for the virtual machine;
- booting a placeholder virtual machine on the third host system to account for operation of the new secondary cache;
- shutting down the placeholder virtual machine on the second host system; and
- transmitting, from the second host system to the third host system, write operations directed to the new primary cache to create mirrored copies on the other secondary cache.

14. The non-transitory computer-readable medium of claim 9, wherein the first or second host system is selected based upon the first or second host system's cache capacity, the relative importance of the virtual machine, resources upon which the virtual machine or other virtual machines depend, files used by the virtual machine, available capacity in other caches, a set of host systems capable of running the virtual machine, or to reserve capacity within a particular host system.

15. The non-transitory computer-readable medium of claim 9, the method further comprising:
- determining, by the first host system, that an acknowledgement has not been received from the second host system within a threshold period of time to confirm the write operation was committed to the secondary cache;
- configuring, by a third host system in response to the determination, storage of the third host system to serve as a new secondary cache;
- booting a placeholder virtual machine on the third host system to account for operation of the new secondary cache; and
- transmitting, in response to write operations from the virtual machine directed to the primary cache, the write operations from the first host system to the third host system to create mirrored copies on the third cache.

16. The non-transitory computer-readable medium of claim 9, the method further comprising:
- altering, by the first host system, a primary cache operating policy from operating as a write back cache to a write through cache in response to a failure or migration of a mirror cache;
- transmitting, by the first host system, dirty data from the primary cache to backing storage for the virtual machine in response to the altered operating policy; and
- altering, by the first host system, the primary cache operating policy from operating as a write through cache to a write back cache in response to recovery or completed migration of the mirror cache.

17. A system comprising:
- a plurality of processing devices, wherein the processing devices execute instructions that cause first and second host systems to perform a method comprising:
  - configuring, by the first host system, storage of the first host system to serve as a primary cache for a virtual machine running on the first host system;

configuring, by the second host system, storage of the second host system to serve as a secondary cache;

booting, by the second host system, a placeholder virtual machine on the second host system to reserve processing, memory, or storage resources within the second host system to account for operation of the secondary cache or when the secondary cache is promoted to become a new primary cache;

transmitting, in response to each of a plurality of write operations from the virtual machine directed to the primary cache, the write operations from the first host system to the second host system to create mirrored copies on the secondary cache, wherein the first host system forwards, to the virtual machine running on the first host system, an acknowledgement of success of each write operation from the virtual machine when the write operation is committed to both the primary cache and the secondary cache;

restarting or resuming the virtual machine on the second host system in response to a failure or migration event; and promoting the secondary cache to serve as a new primary cache for the virtual machine in response to the restarting or resuming of the virtual machine on the second host system.

18. The system of claim 17, wherein the primary cache operates as a write back cache and wherein the transmitting of write operations to the second host system includes a hypervisor agent running on the first host system intercepting the write operations from the virtual machine, transmitting a copy of the intercepted write operation to the second host system, and routing the write operation to the primary cache.

19. The system of claim 17, wherein the first or second host system is selected based upon the first or second host system's cache capacity, the relative importance of the virtual machine, resources upon which the virtual machine or other virtual machines depend, files used by the virtual machine, available capacity in other caches, a set of host systems capable of running the virtual machine, or to reserve capacity within a particular host system.

20. The system of method 17, the method further comprising:

altering, by the first host system, a primary cache operating policy from operating as a write back cache to a write through cache in response to a failure or migration of a mirror cache;

transmitting, by the first host system, dirty data from the primary cache to a backing storage for the virtual machine in response to the altered operating policy; and altering, by the first host system, the primary cache operating policy from operating as a write through cache to a write back cache in response to recovery or completed migration of the mirror cache.

* * * * *